April 24, 1928. 1,667,603
C. PECCAUD
AUTOMATIC BALANCE
Filed Feb. 4, 1925
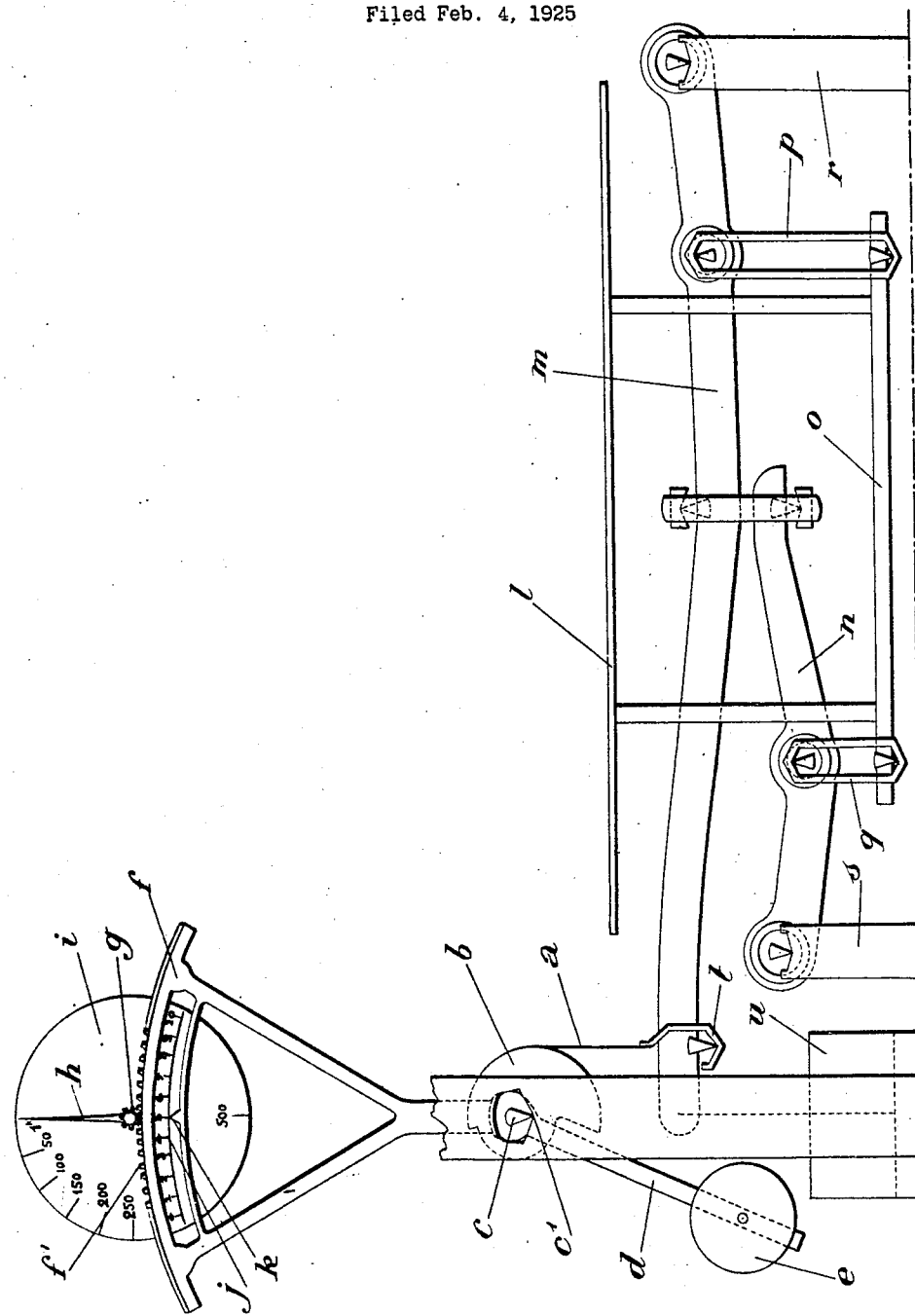
Witnesses
Henri Blouin
Anvri Blouin
Inventor
Charles Peccaud Patented Apr. 24, 1928.

1,667,603

UNITED STATES PATENT OFFICE.

CHARLES PECCAUD, OF MORBIER, FRANCE.

AUTOMATIC BALANCE.

Application filed February 4, 1925, Serial No. 6,693, and in France February 6, 1924.

This invention relates to automatic weighing balances in which the action of the load is transmitted to an indicating system by means of a flexible band acting on a rectifying cam, and the object of the invention is to provide an improved construction of balance of this kind.

It has been proposed heretofore in automatic weighing balances of the kind above referred to, to provide an auxiliary indicating device such as a hand or pointer which is actuated by a pinion engaging a toothed sector which moves with the main indicating device or pointer and is actuated by the rectifying cam.

According to the present invention, an automatic weighing balance in which the action of the load is transmitted to an indicating system by means of a flexible band acting on a rectifying cam is provided, wherein the indicating system consists of a hand or pointer upwardly directed from a toothed sector movable with the hand or pointer, and of a light auxiliary pointer actuated by a pinion which rests on the sector. The pinion rests freely on the teeth of the sector and can thus adjust itself accurately and without play on these teeth whilst the effort required to move the pointer is reduced to a minimum.

A balance constructed according to the present invention is shown, by way of example, on the only figure of the drawing.

In these balances the action of the load is transmitted to the indicating system by means of a flexible metal band $a$ acting on cam $b$ which serves as rectifying curve, this cam $b$ being keyed upon the axle $c$ which carries on the other hand the arm $d$ to which the balancing weight $e$ is attached, the axle carries further an element $f$ the circumference $f'$ of which, concentric to the centre $c'$, is toothed and gears with the pinion $g$ on the axle of which a very light hand $h$ is mounted which moves in front of a stationary dial $i$. The pinion rests upon the teeth of the element $f$ and the spindle which carries the pinion and the hand $h$ is prevented from lateral displacement by suitable guides (not shown) which allow of slight vertical movement of the spindle.

It is evident that the angular amplitude of displacement of the element $f$ for the maximum weight corresponds to a certain number of rotations of the axle which carries the hand $h$ Each oscillation of the element $f$ which corresponds to one revolution of the axle of hand $h$ is marked by one division of a scale $j$, the gear teeth being diagrammatically shown in the drawing for convenience. The scale $j$ has the shape of a sector and, in the construction shown by way of example, is fixed on the dial so that, the apparatus having been regulated so that one revolution of the axle of hand $h$ corresponds to the weight unit chosen, a pointer $k$ carried by the element $f$ indicates on the scale $j$ the number of weight units of the load, at the same time as the hand $h$ indicates on the dial $i$ the fractions of this weight unit.

The action of the load is transmitted to the band $a$ through the intermediary of any convenient transmitting system. In the example shown the scale plate $l$ designed to receive the load transmits the action of this load to levers $m$ and $n$ by means of a traverse $o$ and loops $p$ and $q$, said levers bearing on the other hand upon the stationary supports $r$ and $s$. The lever $m$ is extended beyond its bearing point and its free end is connected to a hook $t$ which forms the end of the band $a$.

An air brake $u$ serves to brake the oscillations. This air brake, which does not form part of the invention, may be of any convenient type, generally known in the art. The resistance opposed by the piston of the air brake owing to the compression of the air or owing to the suction, this air escaping from the cylinder or being sucked in through a very narrow hole, retains the elements to which the piston is connected and, consequently, limits and brakes the oscillation. The number of revolutions of hand $h$, in accordance with the facility of reading desired or for any other reasons, are determined by selecting a pinion of smaller or greater diameter provided that for every weighing operation the number of weight units be indicated on the sector $j$ the hand indicating on the dial $i$ lower values than each of the said weight units.

The principal advantages of the invention are as follows:—

1. The use of a hand turning several times permits of very widely spacing the divisions so that the figures are easy to read. Owing to this arrangement a great precision and indication of the weights is ensured.

2. The sensitiveness of the balances is not modified by the moving of the hands on account of the insignificant weight of the same and of their pinion the effort required from the element $f$ to operate said hands is infinite.

3. Such a system permits of using for balances of all types and sizes dials of short diameter.

4. The form of the scales is not exaggeratively increased by the fact that the balances are used for weighing great weights as the dial needs not be enlarged.

5. The system is very resistant and does not get easily out of order.

I claim:—

An automatic weighing balance comprising in combination, a traverse, a scale plate supported by said traverse, a main lever, a stationary support on which one end of said main lever rests, means for suspending one end of said traverse to said main lever, a secondary lever, a stationary support on which one end of said secondary lever rests, means for suspending said secondary lever on said main lever, means for suspending the other end of said traverse to said secondary lever, a flexible metal band attached at one end to the free end of said main lever, a rectifying cam to which the other end of said flexible metal band is attached, an axle of said cam, an arm fixed on said axle, a balancing weight on said arm, a sector fixed on said cam axle and having a toothed circumference which is concentric to said cam axle, a stationary dial behind said sector and having a scale the graduations of which indicate the weight units and also having graduations along its rim indicating the sub-divisions of said weight units, a pointer rigid with said sector and adapted to move in front of said unit scale, a pinion gearing with the toothed circumference of said sector, and a light hand fixed on the axle of said pinion and moving over said graduations near the rim of said dial.

In testimony whereof I affix my signature.

CHARLES PECCAUD.